No. 668,116. Patented Feb. 12, 1901.
C. H. NOBLE.
WRENCH.
(Application filed Jan. 5, 1900.)

(No Model.)

WITNESSES
John Buckler,
F. A. Stewart

INVENTOR
Charles H. Noble,
BY
Edgar Tate
ATTORNEYS

THE NORRIS PETERS CO., PHOTO-LITHO., WASHINGTON, D. C.

UNITED STATES PATENT OFFICE.

CHARLES HENRY NOBLE, OF ELLISBURG, NEW YORK.

WRENCH.

SPECIFICATION forming part of Letters Patent No. 668,116, dated February 12, 1901.

Application filed January 5, 1900. Serial No. 430. (No model.)

*To all whom it may concern:*

Be it known that I, CHARLES HENRY NOBLE, a citizen of the United States, residing at Ellisburg, in the county of Jefferson and State of New York, have invented certain new and useful Improvements in Wrenches, of which the following is a full and complete specification, such as will enable those skilled in the art to which it appertains to make and use the same.

This invention relates to wrenches; and the object thereof is to provide an improved tool of this class which is simple in adjustment and positive in operation.

My invention consists in the construction and arrangement of parts hereinafter specified.

Figure 1:
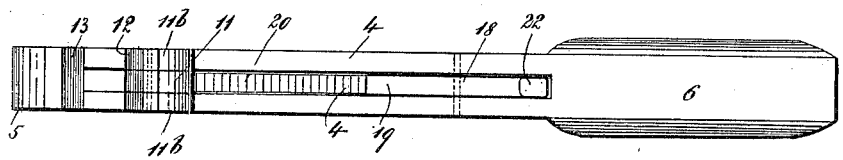
Figure 2:
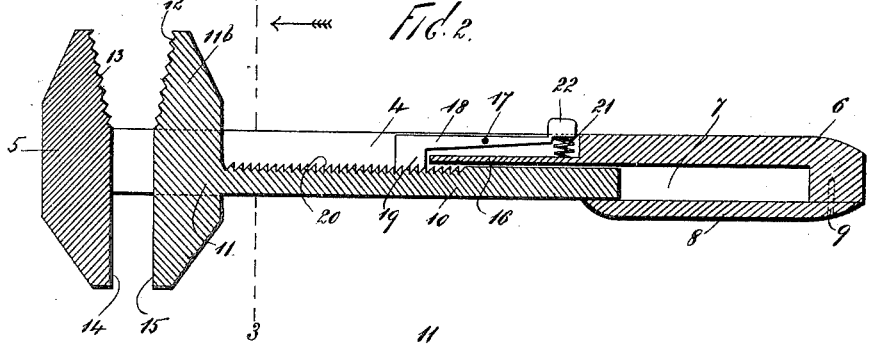
Figure 3:
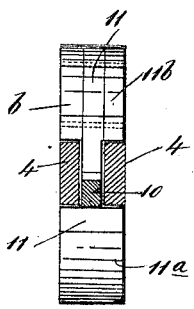

In the drawings forming part of this specification, in which like reference characters denote like parts in the several views, Figure 1 is a longitudinal top view; Fig. 2, a longitudinal sectional view thereof, and Fig. 3 a section of Fig. 2 on the line 3 3 thereof.

In the practice of my invention I provide a body portion comprising a shank 4, carrying a fixed head 5 at one end and a handle 6 at the opposite end. The handle 6 is chambered longitudinally, as shown at 7 in Fig. 2, and provided with a detachable bottom plate 8, secured thereto at 9 and by which said chamber is normally closed. A supplemental shank 10 operates slidably within the chamber 7 in the handle 6 and carries at the opposite end a supplemental fixed head 11, which operates in connection with the head 5, which is fixed to the shank 4. The shank 4 is longitudinally bifurcated, as clearly shown in the drawings, and the supplemental shank 10 operates slidably therein, carrying the head 11, and said head 11 is enlarged at one side of the shank 4, as shown at 11ª, and provided at the other side with two detachable side pieces 11ᵇ, which are secured thereto when the parts are in the position shown in Figs. 1 and 3.

The operative faces of the side plates 11ᵇ and the portion of the head 11 therebetween are serrated, as shown at 12 in Fig. 2, and the corresponding operative surface of the head 5 is similarly serrated at 13 in Fig. 2. The operative faces of the head 11 are coextensive in width and length with the operative faces of the head 5, the serrated faces 12 and 13 being preferably formed outwardly diverging, and the operative face 14 of the head 5 at the other side of the shank 4, together with the operative face 15 of the enlarged portion 11ª of the head 11, are plane and parallelly arranged, as shown in Fig. 2.

The handle 6 is provided with a forwardly-directed ledge 16, which extends between the sides of the bifurcated shank 4, and pivoted in said shank, at either side thereof, at 17 is a catch 18, provided with a catch-head 19, which operates in connection with serrations 20, formed upon the upper surface of the supplemental shank 10. A spring 21 is interposed between the ledge 16 and the inner end of the catch 18, which is formed into a button 22, whereby said catch-head is normally maintained in engagement with the serrations 20, and said serrations are so formed that said catch-head prevents the movement of the shank 10 rearwardly or into the chamber 7 in the handle 6, but allows the reverse movement thereof to bring the head 11 toward the head 5 or into engagement therewith or with an object placed between said heads.

In assembling the parts of the wrench above described the inner end of the shank 10 is inserted into the chamber 7 in the head 6, and the plate 8 is then secured to said handle at 9. The side plates 11ᵇ are then connected with the portion of the head 11 which with the parts in the position shown in the drawings is included therebetween. The tool will then be assembled for use, and the operation thereof will be manifest from the foregoing description when taken in connection with the accompanying drawings.

When it is desired to withdraw the head 11 from the head 5 to insert an object between said heads, the button 22 is depressed against the spring 21, raising the catch-head 19 from the serrations 20 and allowing the inner end of the shank 10 to pass into the chamber 7. When the object to be gripped has been adjusted between said heads, the head 11 is forced thereagainst, and the catch-head 19 prevents the retraction of said head 11, firmly gripping the object between said head and the head 5. It is evident that the serrated divergent faces 12 and 13, as well as the plane parallel faces 15 and 14 of the respective heads 11 and 5, may be formed with any desired contour or relative arrangement and that the several other parts of my improved tool, as above described, may be varied in construction and arrangement without departing from the spirit of my invention or sacrificing the advantages thereof.

Having fully described my invention, I claim as new and desire to secure by Letters Patent—

1. A wrench, comprising a handle provided with a shank having a stationary head or jaw at its outer end, said handle being provided with a longitudinal chamber, and a plate for closing the same, and said shank being longitudinally slotted, and a movable jaw or head provided with a reduced portion which is passed through the slot in said shank, and with a shank which moves in said slot and in the chamber in the handle, the reduced portion of said movable jaw or head being provided with side pieces which form a part thereof, and a pivoted spring-operated catch mounted in the slot in the shank of the stationary jaw or head, and provided with a thumb-piece adjacent to the handle, and with a head which engages transverse teeth on the shank of the movable jaw or head, substantially as shown and described.

2. A wrench, comprising a handle provided with a shank having a stationary head or jaw at its outer end, said handle being provided with a longitudinal chamber, and a plate for closing the same, and said shank being longitudinally slotted, and a movable jaw or head provided with a reduced portion which is passed through the slot in said shank, and with a shank which moves in said slot and in the chamber in the handle, the reduced portion of said movable jaw or head being provided with side pieces which form a part thereof, and a pivoted spring-operated catch mounted in the slot in the shank of the stationary jaw or head, and provided with a thumb-piece adjacent to the handle, and with a head which engages transverse teeth on the shank of the movable jaw or head, the transverse teeth and the head of the catch being so formed that the movable jaw is free to move in one direction, but cannot move in the other without the catch being operated, substantially as shown and described.

3. A wrench, comprising a handle provided with a shank having a stationary head or jaw at its outer end, said shank being slotted longitudinally, and said handle being provided with a longitudinal chamber which communicates with said slot, and a movable jaw or head provided with a reduced portion which is passed through the slot in said shank, and with a shank which moves in said slot and in the chamber in the handle, the reduced portion of said movable jaw or head being provided with side pieces which form a part thereof, and which hold the movable jaw and its shank in proper position, and a pivoted spring-operated catch mounted in the slot of the shank of the stationary jaw, and provided with a thumb-piece adjacent to the handle, and with a head which engages transverse teeth on the shank of the movable jaw or head, substantially as shown and described.

In testimony that I claim the foregoing as my invention I have signed my name, in presence of the subscribing witnesses, this 3d day of January, 1900.

CHARLES HENRY NOBLE.

Witnesses:
ALBERT P. WILLIAMS,
FRANK E. BONNER.